United States Patent [19]

Ledebuhr et al.

[11] 4,122,766

[45] Oct. 31, 1978

[54] FRUIT AND VEGETABLE DECAPPING MACHINE

[75] Inventors: Richard L. Ledebuhr, Haslett; Clarence M. Hansen, E. Lansing; Richard J. Patterson, Okemos, all of Mich.

[73] Assignee: Michigan State University, East Lansing, Mich.

[21] Appl. No.: 708,515

[22] Filed: Jul. 26, 1976

Related U.S. Application Data

[63] Continuation-in-part of Ser. No. 469,164, May 13, 1974, abandoned.

[51] Int. Cl.² ............................................. A23N 15/02
[52] U.S. Cl. ........................................ 99/640; 99/643; 198/394; 198/533; 198/755; 198/766
[58] Field of Search ................. 99/635, 546, 640–643, 99/637; 83/661, 411 R, 409.1, 4, 811; 259/DIG. 42; 198/533, 382, 394, 755, 759, 764, 766, 772

[56] References Cited

U.S. PATENT DOCUMENTS

| | | | |
|---|---|---|---|
| 883,708 | 4/1908 | Fontana | 99/640 |
| 1,029,918 | 6/1912 | Dunkley | 99/640 |
| 1,489,061 | 4/1924 | Burdick | 99/640 |
| 2,306,035 | 12/1942 | Burdick | 99/643 |
| 2,324,380 | 7/1943 | Frei | 83/661 |
| 3,014,478 | 12/1961 | Ware | 128/46 |
| 3,385,330 | 5/1968 | Haynes | 83/811 |

*Primary Examiner*—Robert W. Jenkins
*Assistant Examiner*—John M. Jillions
*Attorney, Agent, or Firm*—Hirons & Rogers

[57] ABSTRACT

A machine for detopping fruits and vegetables, specially suited for the decapping of strawberries by severing the top therefrom, comprises an endless upwardly-inclined loop type conveyor mounted on a sub-frame which is in turn mounted on a main frame for horizontal orbital motion relative thereto. The conveyor consists of a receiving station section inclined to the horizontal so that already decapped product discharges against the travel of the conveyor, and a severing station section at a higher level than the receiving station section, a downwardly-extending discharge section and a return section. The conveyor consists of parallel rollers alternate ones of which are positively driven by pinion gears engaging rack members at the side, so that co-operating pairs will grip the tops. Only product that has been so gripped can be conveyed upwards by the conveyor and presented to a transversly moving endless band severing knife at the severing station. The orbital motion causes the product to be orientated into a position which facilitates gripping of the caps by the cooperating roller pairs.

17 Claims, 8 Drawing Figures

FRUIT AND VEGETABLE DECAPPING MACHINE

CROSS-REFERENCE TO RELATED APPLICATIONS

This application is a continuation-in-part of our earlier application Ser. No. 469,164 filed May 13th 1974, now abandoned.

FIELD OF THE INVENTION

The present invention is concerned with improvements in or relating to machines for detopping fruits and vegetables and especially, but not exclusively, to machines for decapping strawberries.

REVIEW OF THE PRIOR ART

The detopping of fruits and vegetables is a continuing problem in their successful economic processing, and strawberries present a special problem because of their irregular size and shape, and the fact that it is an extremely tender fruit which requires careful handling. It is found that detopping of most fruits and vegetables by hand is now so expensive as to raise the price thereof to an uneconomical level, and many attempts have been made in the past to provide machines which will detop automatically. Such machines are disclosed for example in U.S. Pat. Ser. Nos. 1,489,061 (Burdick); 1,835,190 (Stansbury); 2,323,668 (Morgan) and 2,479,961 (Paul). The usual procedure with fruits such as cherries and strawberries is to arrange that the stem and cap respectively is pulled therefrom; Burdick discloses a machine for detopping vegetables such as onions, beets, carrots and the like in which the tops are severed from the vegetables.

The "cap" of a strawberry is usually regarded as comprising the stem, sepals and the core and ideally when the fruit is decapped all three parts are completely removed. In many cases however the stem and sepals are successfully removed, but together with part only of the core, and strawberry fruits with core parts remaining therein are not acceptable in the higher grades. To avoid confusion in terminology a decapping operation which is able to ensure removal of the centre stem, all sepals and the centre core is referred to herein as "complete decapping". Thus, complete decapping of strawberries is obtained with apparatus of the present invention by severing the top of the berry including the centre unwanted core. It will be appreciated that a machine which is able to operate successfully with such a difficult fruit product as strawberries will also be readily applicable to the detopping of more easily handled fruits and vegetables.

DEFINITION OF THE INVENTION

It is an object of the invention to provide a new machine for detopping fruits and vegetables.

It is a more specific object to provide a new machine for complete of strawberries in which the whole top of the strawberry is severed from the body thereof.

In accordance with the invention there is provided a machine for detopping fruits and vegetables by severing therefrom the top portion including a cap, if present, the machine comprising:

a frame;
a sub-frame;
means mounting the sub-frame to the frame for orbital motion relative to the frame in two directions transverse to one another and having at least a component in the horizontal plane;
drive means connected to the sub-frame for moving the sub-frame relative to the frame in the said orbital motion;
an upwardly-inclined conveyor mounted by the sub-frame and conveying fruits and vegetables upwards thereon from a receiving station on the upwardly moving part thereof and to a severing station at which the said top portions are severed;
the conveyor including gripping means operative over the part of its path between the receiving and severing stations for gripping the fruits and vegetables on the conveyor by their tops with the bodies of the fruits and vegetables extending away from the conveyor, and so that gripped, topped fruits and vegetables will be conveyed upwards from the receiving section;
the said orbital motion of the sub-frame and the conveyor changing the orientation of the fruits and vegetables on the conveyor to facilitate their gripping by the conveyor gripping means; and
knife means at the severing station for severing the tops from the fruits and vegetables delivered thereto by the conveyor.

Also in accordance with the present invention there is provided a machine for decapping fruits and vegetables comprising: a frame; a sub-frame; means mounting the sub-frame to the frame for orbital motion relative to the frame in two directions transverse to one another and having at least a component in the horizontal plane; drive means connected to the sub-frame for moving the sub-frame relative to the frame in the said orbital motion; an upwardly-inclined conveyor mounted by the sub-frame for conveying fruits and vegetables upwards thereon from a receiving station on the upwardly-moving part thereof; the conveyor including gripping means operative over the said upwardly-moving part of its path for gripping the caps of the fruits and vegetables and for pulling the caps therefrom, the fruits and vegetables that have their caps thus pulled therefrom thereafter moving downwardly on the upwardly-moving part of the conveyor to a discharge station; the said orbital motion of the sub-frame and the conveyor changing the orientation of the fruits and vegetables on the conveyor to facilitate the gripping of their caps by the said conveyor gripping means.

DESCRIPTION OF THE DRAWINGS

Particular preferred embodiments of the invention intended for the complete decapping of strawberries will now be described, by way of example, with reference to the accompanying diagrammatic drawings wherein.

Similar parts are given the same reference number in all the Figures of the drawings.

DESCRIPTION OF THE PREFERRED EMBODIMENTS

Figure 1:
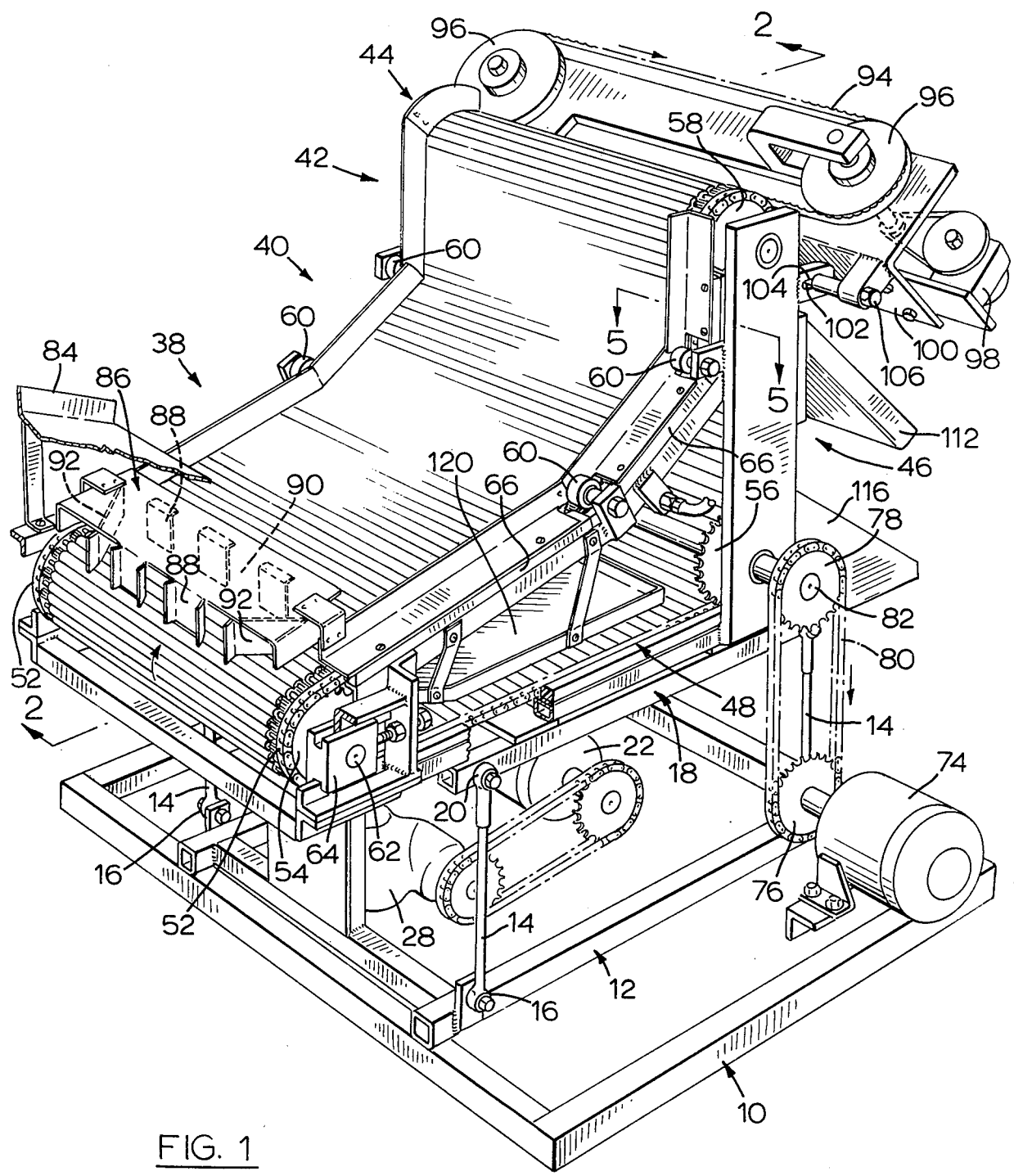
FIG. 1 is a general perspective view of a first embodiment from one side at about eyelevel, parts being shown broken away as necessary for clarity of illustration.
Figure 2:
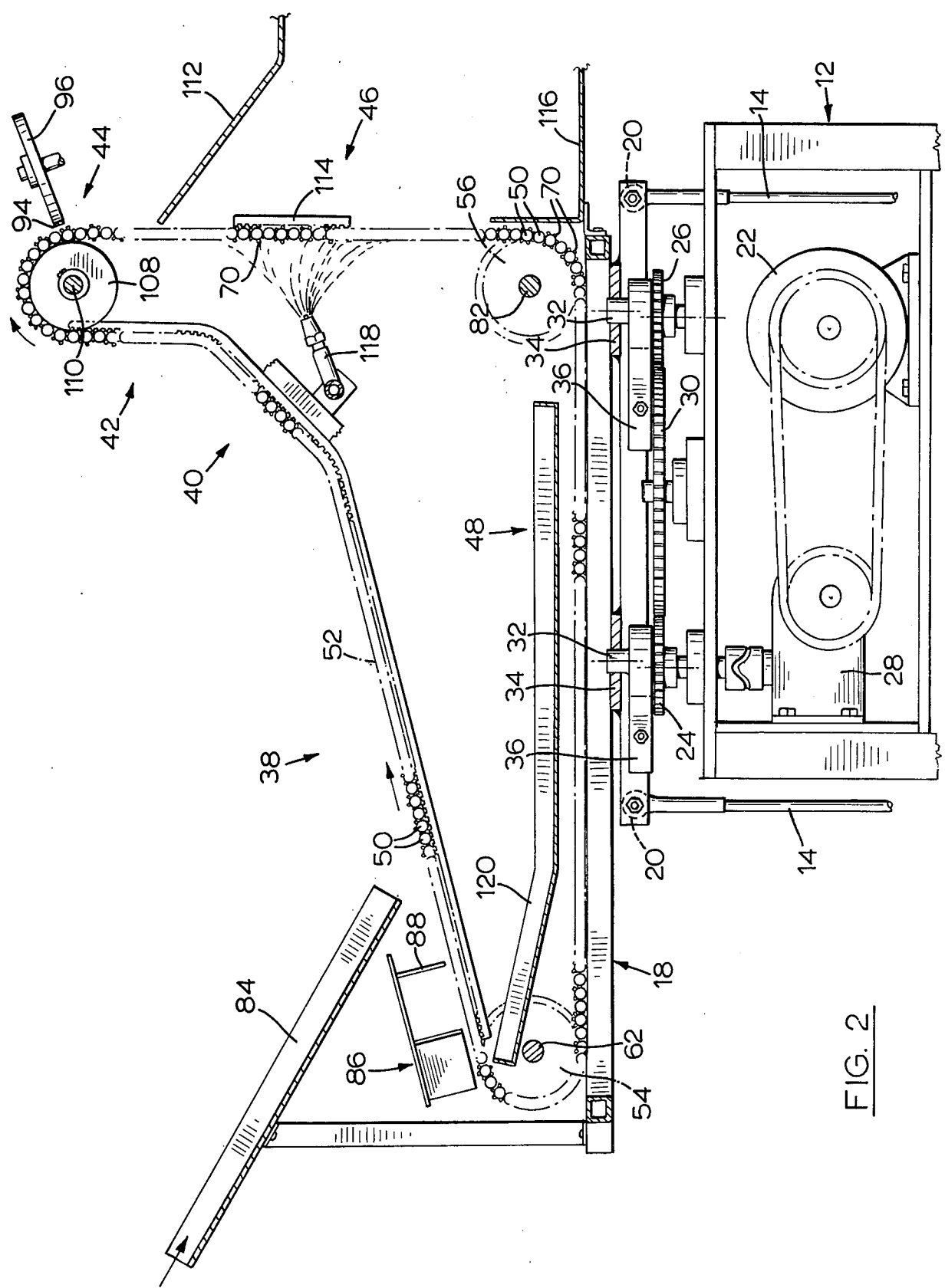
FIG. 2 is a side section taken on the line 2—2 of FIG. 1.

The embodiment described herein with reference to FIGS. 1 to 6 comprises a frame constituted by a rigid main base 10 upon which is mounted a sub-base 12 of generally rectangular shape as seen in plan. Four vertically-upwardly-extending rods 14 are disposed respectively at the four corners of the sub-base and are connected thereto by ball joints 16, the rods supporting at their upper ends a sub-frame 18 which is connected to the rods by ball joints 20. An electric motor 22 is mounted on the sub-base 12 and drives pinions 24 and 26 about respective vertical axes through a reduction gear 28 and an idler pinion 30. The pinions 24 and 26 are connected by respective eccentrically-disposed pins 32 to respective cross members 34 of the sub-frame 18. Each of the pinions 24 and 26 has mounted thereon a counter-weight 36 which rotates with the respective pinion in a horizontal plane.

As the pinions rotate about their vertical axes the subsidiary frame 18, and the structure mounted thereon, is moved with an orbital motion in a horizontal plane, such motion being sufficiently counterbalanced by the horizontally-rotating weights 36, to eliminate any possibility of movement of the base 10 over the floor on which it rests while the machine is in operation. In this specific machine the frequency of this orbital motion is preferably within the range 75 to 250 excursions per minute with an amplitude from ½ to 2 inches. More preferably the frequency is 175 excursions per minute with an ampltidue of ¾ inch.

The frame 18 has mounted thereon a conveyor of endless loop type the path of which may be regarded as traversing six distinct sections indicated generally by the references 38, 40, 42, 44, 46 and 48. These sections comprise firstly a receiving section 38, which in this embodiment is inclined at about 15° to the horizontal, secondly an intermediate section 40 inclined at a much greater angle to the horizontal (45° in this particular embodiment), and thirdly a segregating section 42 which in this embodiment ascends vertically upwards. The topmost part of the conveyor path constitutes a fourth severing section 44 in which the conveyor turns from moving vertically upwards to moving vertically downwards, while the fifth section is a discharge section 46 in which the conveyor is moving downwards. The run of the conveyor is completed by a sixth horizontal return section 48.

In this preferred embodiment the endless loop conveyor consists of a large number of small diameter parallel rollers 50 which are arranged to cooperate in pairs. Thus, in this particular construction the conveyor is formed by two roller chains 52 which pass around sprockets 54, 56 and 58, and beneath guide rollers 60. The sprockets 54 are mounted on a shaft 62 carried by bearing blocks 64 which can be moved in suitable guides to adjust the tension in the chains.

The parts of the chains constituting at any time the delivery, intermediate and segregating sections of the conveyor are constrained to run through channels in guide members 66 of a suitable low friction material (such as nylon or delrin), which guide members accurately determine the path which the rollers 50 must follow. The roller chain is of a special form (see FIGS. 3 to 5) in which the pins 68 forming the pivots between successive links extend beyond the chain and enter into bores in the rollers so that the rollers can turn freely on the pins. Each alternate roller has a pinion 70 mounted thereon and at certain points in the path of the conveyor these pinions engage rack members 72, which rotate the rollers as the conveyor moves in its linear path. The guide members 66 also hold the pinions in mesh with the rack members. In other embodiments all of the rollers may be positively driven, e.g. by rack and and pinion gears, insted of only alternate rollers. The conveyor is driven in its path by an electric motor 74 fastened to the base 10 and operatively connected via sprockets 76 and 78 and chain 80 to a shaft 82 to which the sprockets 56 are fastened. The controls for the various electric motors of the machine are not illustrated.

Figure 3:
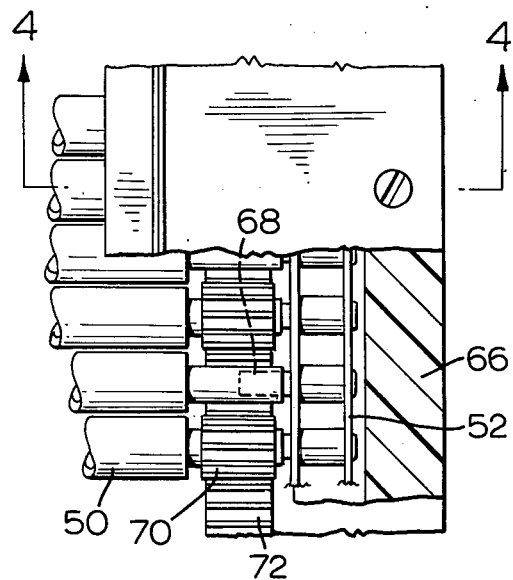
FIG. 3 is a view from above of one end of part of the conveyor of the embodiment of FIG. 1 to show the manner in which it is constructed.
Figure 5:
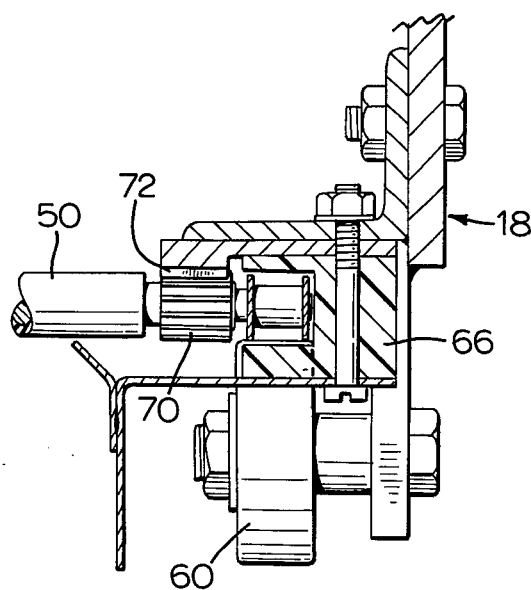
FIG. 5 is a section taken on the line 5—5 of FIG. 1.
Figure 4:
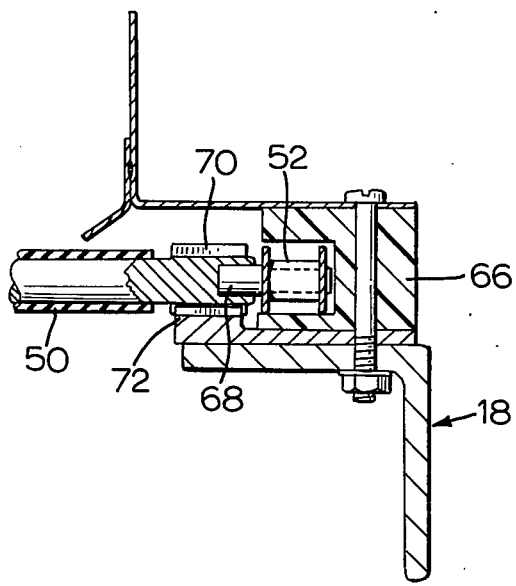
FIG. 4 is a section taken on the line 4—4 of FIG. 3.

The rollers each consist of a central metal rod with a sleeve of resilient material thereon and they are arranged to just contact one another by suitable choice of chain pitch and metal rod diameter, etc. The spacing between the rollers as shown in FIG. 3 is exaggerated for clarity in illustration. Each roller carrying a pinion 70 is operative with its associated immediately adjacent rollers and contacts them by friction and causes them to rotate. Each immediately adjacent pair of rollers therefore operates either as gripping means or ejecting means, so that if the stem and/or a sepal of a berry lying on the rollers happens to engage between the nip of two gripping rollers it will immediately be drawn down, the berry being firmly held closely against the rollers with sufficient force to grip it firmly but not to pull the cap therefrom. If the stem and/or sepal enters between two ejecting rollers then of course it will immediately be ejected and the berry freed to move around until it is gripped. Any berry that is gripped in this manner is sufficiently firmly held that it can be carried up the receiving section onto the intermediate section and will be conveyed up the vertical segregating section. Berries which are not firmly gripped in this manner will tumble about on the delivery section and may even be carried up the intermediate section and to the segregating section if they are supported by other gripped berries, but in the vertical segregating section they will roll from the berries which are conveying them and will return to the receiving section. It will be recalled that all this time the whole conveyor is orbiting in a horizontal plane so that free berries are continuously reoriented by the resulting orbital motion imparted to them, in addition to the rolling motion produced by the conveyor, and the possibility that they will be caught and gripped by a roller pair is very high indeed.

The berries to be decapped are fed onto the receiving section via a chute 84. As is described above, the receiving section 38 is inclined rearwardly at an angle which, for this embodiment, preferably is about 15°, and will usually be between 10° and 20°, depending upon the friction between the fruit or vegetables being decapped and the conveyor and thus the ease with which they will roll backwards if not gripped. It is almost always the case, especially with a hand-picked crop, that some of the product will already be decapped and cannot be gripped; these decapped berries, etc. will roll slowly down the section until they discharge off the conveyor into a suitable receptacle (not shown). Any such ungripped product must pass through a gate 86 consisting of three forward transversely-spaced vertical baffle plates 88 suspended for free forward swinging motion and having spaces 90 in between them. Each of the two central spaces 90 has another rearward fixed vertical deflector plate 88 in register therewith, while the two side apertures register with transversely inclined guides 92, so that the rearwardly moving berries, etc. must follow a tortuous path in order to pass off the rear end of the conveyor, with increased possibility that if they have a cap or only a portion of a cap protruding therefrom they will be gripped by the rollers and carried forward again.

The precise angle of inclination of the intermediate section 40 to the vertical is immaterial, since it serves only as a convenient transition arrangement between the slightly-inclined receiving section and the steeply-inclined segregating section 42. Conveniently the segregating section is truly vertical, but some variation is possible within a preferred range of ±15° to the truly vertical, and the section is therefore defined in the appendant claims as being disposed generally vertical. With the segregating section disposed at −15° to the vertical the gripped berries must pass thorugh an overhanging configuration with no possibility whatsoever that an ungripped berry can be conveyed through the section.

The severing section 44 comprises the top end of the conveyor and the part thereof just as it starts its vertically downward run, and at this point there is mounted a continuously-operating band knife 94 which passes around pulleys 96 and is driven by a motor 98 at high speed. Preferably this knife is of a type having a serrated cutting edge and preferably it is operated at speeds of approximately 1200–1500 feet per minute, giving a highly effective cutting action without damage to the very soft and easily bruised berries. The knife, its supporting pulleys and the driving motor are mounted as a unit on a base plate 100, which is mounted on the subframe by a pivot rod 102, the rod passing through elongated slots such as 104 and being fixed in position by clamp nuts such as 106. Such an arrangement permits the spacing of the knife blade from the effective conveyor surface, and its inclination to that surface, to be adjusted to the required extent for the product that is being decapped, the action of the knife being illustrated most clearly by FIG. 5. Thus, the depth of cut is made just sufficient for the removal of the tops of the berries including the cap together with the unwanted core, while the inclination of the blade to the surface is slightly more than tangential, so that the severed body is thrown away from the conveyor face as soon as it separates from the gripped severed cap and clearance is provided for the severed tops to pass underneath the blade.

At the top part of the conveyor the pinions 70 disengage from the driving rack members 72 and instead the surfaces of the rollers 50 are engaged by the surface of a disc brake member 108 which is fixed to a shaft 110 carrying the sprockets 58 and is rotatable with the shaft. The engagement of the brake disc with the conveyor rollers holds them against rotation, so that they now move with only a linear motion while gripping the stems and/or sepals of the berries firmly therebetween by the frictional contact between the rollers. It will be noted that the rack members extend upwards until they are tangential to the disc brake, so that the rollers are either positively rotated or positively braked and at no time can they rotate freely with the possibility of loosing their grip on the berries.

It is during this linear motion that the tops of the berries are engaged by the high speed knife and separated from the main bodies, leaving the tops behind gripped by the rollers, while the berry bodies fall onto a discharge chute 112 which discharges it to a suitable receptacle (not shown). During some part of their downward movement in the discharge section 46 the pinions 50 engage a rack member 114 on the opposite side of the conveyor to the members 72, so that it drives the rollers in the direction to eject the gripped severed tops therefrom, the ejected tops then passing via another discharge chute 116 to a suitable receptacle (not shown).

At the discharge part of the discharge section the rear surface of the conveyor is sprayed with water from nozzles 118, which serves the double purpose of assisting in washing dirt and the tops from the conveyor into the discharge chute 116, and also in ejecting the tops from the conveyor. The water also acts as a lubricant between the roller surfaces ensuring that they provide a soft but firm gripping of the tops. Inevitably some caps will be so loosely held on the berries that the gripping thereof in the receiving section 38 will pull them from the bodies, and these caps will be pulled through the conveyor and caught by a tray 120.

Figure 6:
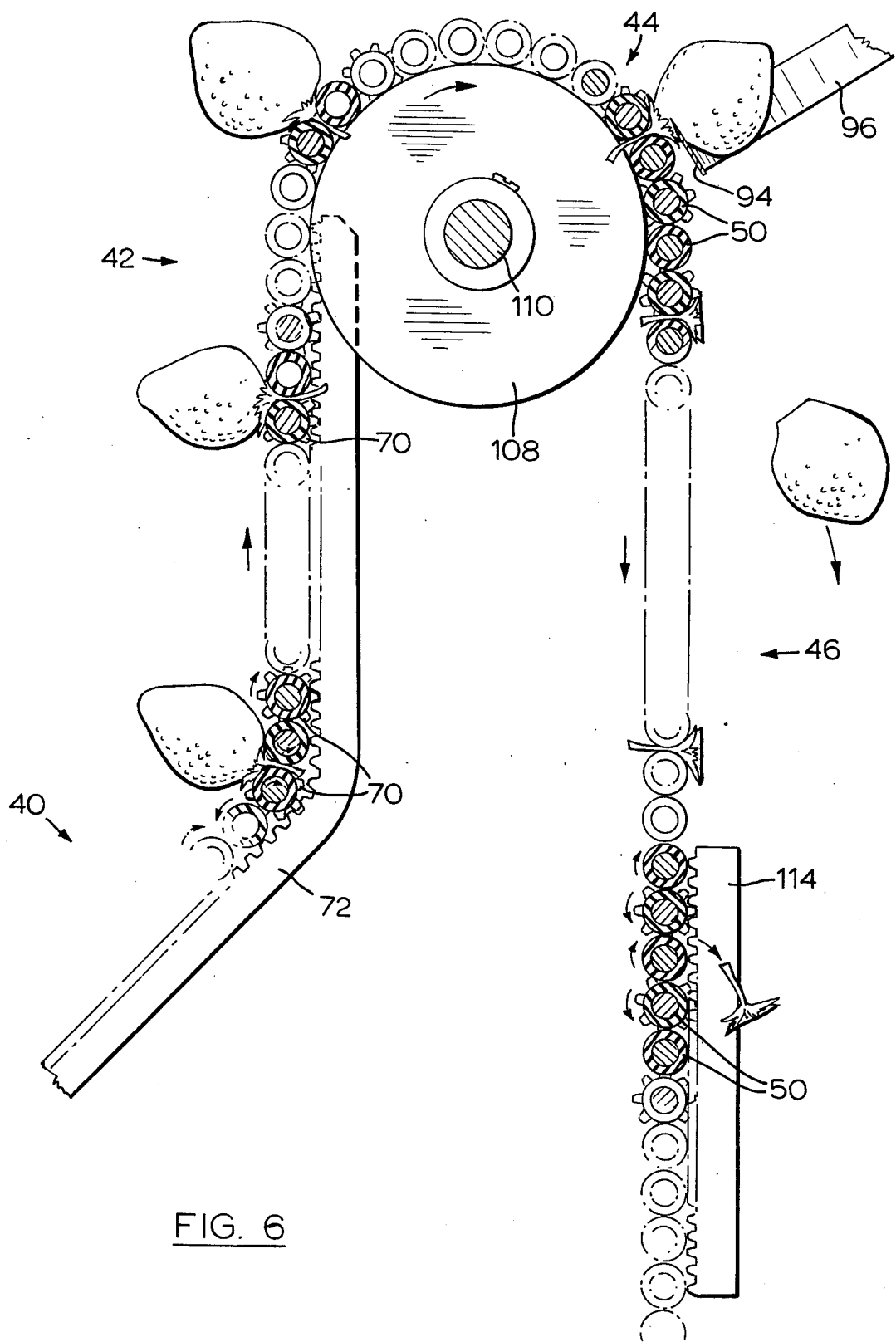
FIG. 6 is a schematic view to a larger scale than FIGS. 1 and 2 to show the mode of operation at the severing station of the machine of FIGS. 1 to 5.
Figure 7:
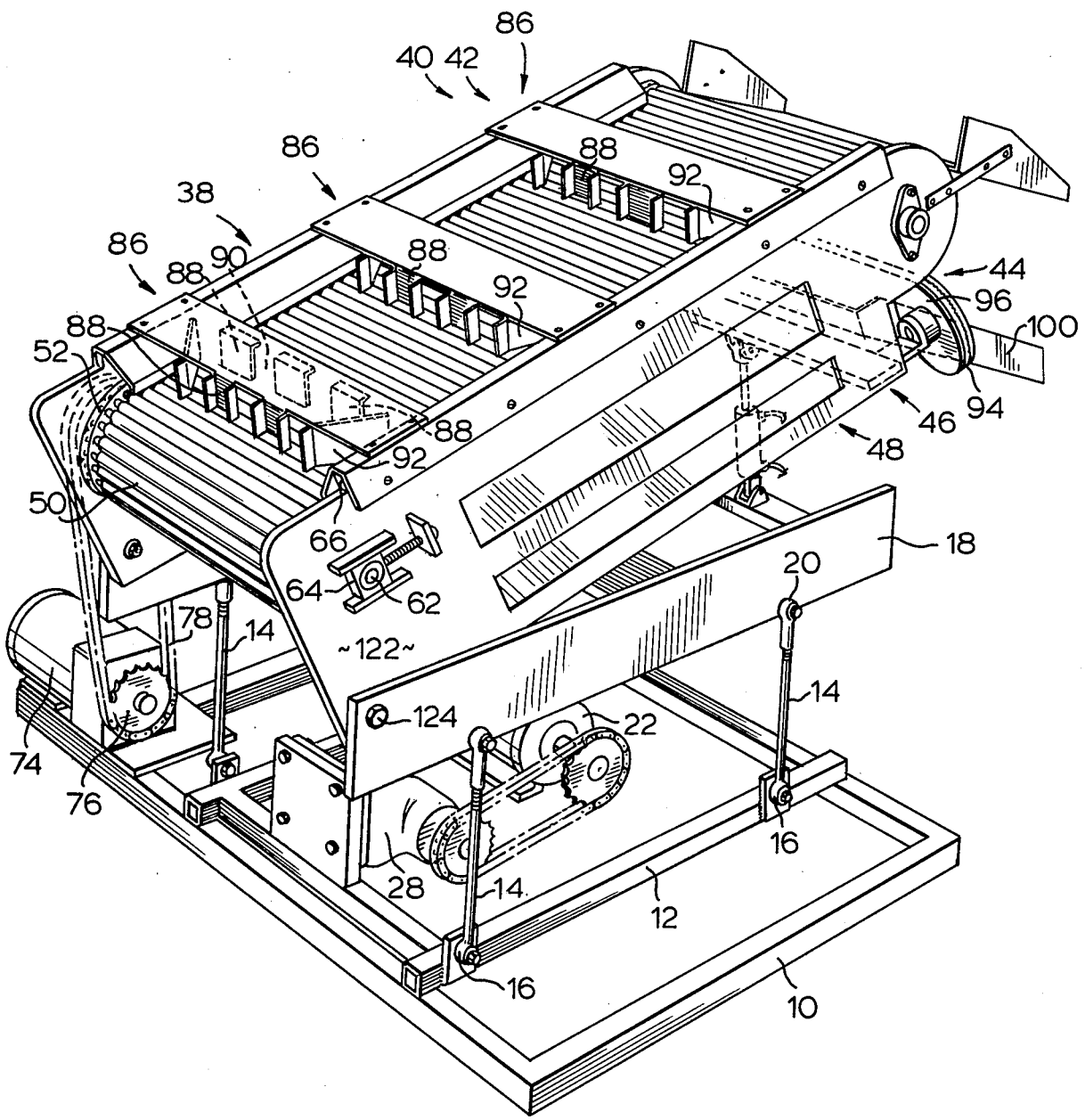
FIG. 7 is a view similar to FIG. 1 of a second embodiment of the invention.
Figure 8:
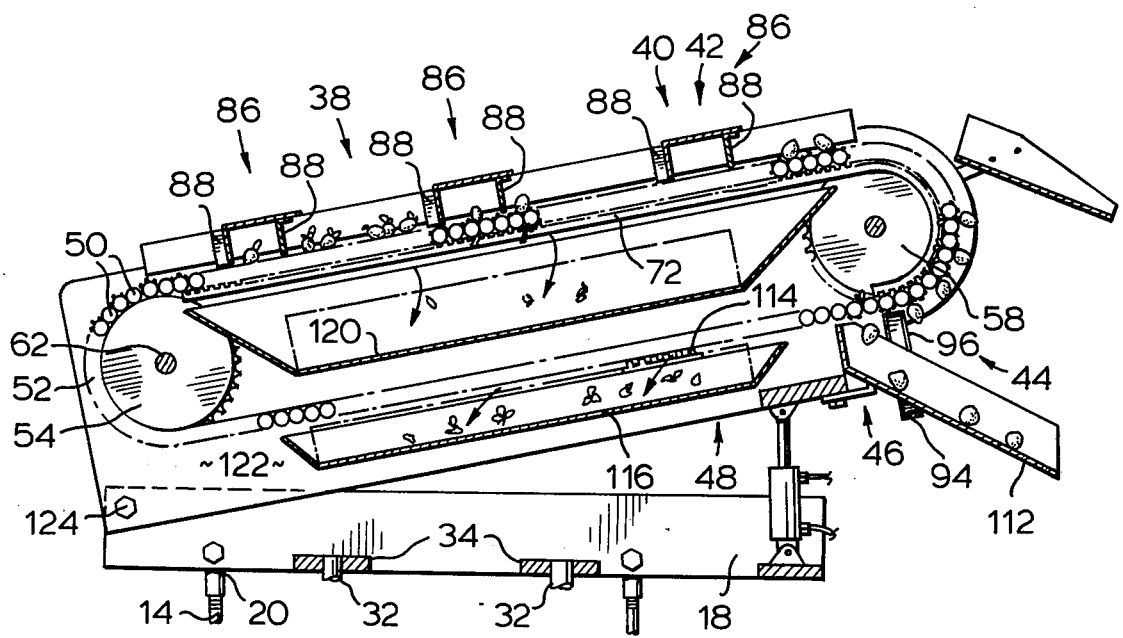
FIG. 8 is a part section similar to FIG. 2 of the second embodiment.

In the embodiment shown in FIGS. 6 and 7 the conveyor is straight in both its upper and lower runs and therefore is carried by only the two sprockets 54 and 58, the sprockets 54 on shaft 62 being driven by the motor 74. In this embodiment the immediate section 40 and segregating section 42 have effectively become merged into a single section; the severing section 44 is now located at a position beneath the conveyor just before it commences the lower run from the sprocket 48, while the discharge section 46 is located at the beginning of this lower run. The operation of the embodiment is otherwise essentially the same as with the embodiment of FIGS. 1 to 6.

The angle of inclination of the conveyor is made readily adjustable by pivoting its support frame 122 at one end to the sub-frame 18 by pivot bolts 124. A double-acting hydraulic piston and cylinder motor 124 is interposed between the other end of the support frame 122 and the sub-frame 18, and is actuated by conventional means for this purpose. A plurality of the gates 86, three in this embodiment, are spaced equally along the conveyor upper run, the lowermost one being disposed below the delivery section as described with the first embodiment. Each of these gates is of the construction previously described, namely having forward transversely-spaced vertical baffle plates suspended for free forward swinging motion, and rearward fixed plates registering with the gaps between the forward plates. Thus, the forwardly-moving berries must also follow a tortuous path in passing through the two upper gates 86, with highly increased possibility that they will be gripped by the rollers.

The brake means for the conveyor are not employed in this embodiment, and instead the rack 72 is continued over the sections 40, 42 and 44 to terminate just at the beginning of the discharge section 46 and commencement of the discharge rack 114.

A machine in accordance with the invention and specifically designed for the decapping of strawberries has rollers of about ⅜ inch diameter, 16 inches wide, and a total conveyor loop length of about 96 inches. It will be appreciated by those skilled in the art that this is an extremely compact machine, and yet it is easily able to handle at least 1000 pounds of berries per hour, which is adequate for most commercial operations, with at least 99% success in decapping the berries that pass through the severing station, the actual figure depending chiefly upon the variety or physical conformation of berries fed thereto.

We claim:

1. A machine for detopping fruits and vegetables by severing therefrom the top portion including a cap, if present, the machine comprising:

a frame;

a sub-frame;

means mounting the sub-frame to the frame for orbital motion relative to the frame in two directions transverse to one another and having at least a component in the horizontal plane;

drive means connected to the sub-frame for moving the sub-frame relative to the frame in the said orbital motion;

an upwardly-inclined conveyor mounted by the sub-frame for conveying fruits and vegetables upwards thereon from a receiving station on the upwardly-moving part thereof and to a severing station at which the said top portions are severed;

the conveyor including gripping means operative over the part of its path between the receiving and severing stations for gripping the fruits and vegetables on the conveyor by their tops with the bodies of the fruits and vegetables extending away from the conveyor and, so that gripped, topped fruits and vegetables will be conveyed upwards from the receiving station away from the conveyor;

the said orbital motion of the sub-frame and the conveyor changing the orientation of the fruits and vegetables on the conveyor to facilitate their gripping by the conveyor gripping means; and knife means at the severing station for severing the tops from the fruits and vegetables delivered thereto by the conveyor.

2. A machine as claimed in claim 1, and for decapping strawberries wherein the said orbital motion takes place at between about 75 to 250 excursions per minute.

3. A machine as claimed in claim 1, wherein the said drive means comprises a rotary member mounted by the frame for rotation in a horizontal plane about a vertical axis, a vertically-extending pin member mounted on said rotary member spaced from said vertical axis and connecting the rotary member and the sub-frame so as to impart said horizontal orbital motion to the sub-frame, and a counter-weight rotatable with the rotary member.

4. A machine as claimed in claim 1, wherein the said drive means comprise two rotary members mounted by the frame and connected together for simultaneous rotation in a horizontal plane about respective vertical axes, respective vertically-extending pin members each mounted on its respective rotary member spaced from its vertical axis and connecting its respective rotary member and the sub-frame so as to impart said horizontal orbital motion to the sub-frame, and two counter-weights each rotatable with a respective rotary member.

5. A machine as claimed in claim 1, wherein the conveyor comprises a plurality of spaced parallel rollers extending transversely of the direction of travel of the conveyor, and the said gripping means comprises driving means for positively rotating rollers thereof in their travel, so that each roller will cooperate with an immediately adjacent roller to draw tops in between them and thereby grip the tops while the fruit or vegetable is carried upward by the conveyor.

6. A machine as claimed in claim 5, wherein the conveyor comprises brake means disposed at the severing station and operative to brake the rotation of the rollers during their movement through the station and thereby to positively hold the gripped tops as they are severed.

7. A machine as claimed in claim 6, wherein the part of the conveyor at the severing station is supported by a rotatable shaft mounted to the sub-frame, and the said brake means comprise a disc mounted on the said shaft and rotatable therewith, the periphery of the disc frictionally engaging the peripheries of the immediately adjacent conveyor rollers to thereby hold them against rotation about their own axes.

8. A machine as claimed in claim 5, wherein the said driving means for positively rotating rollers of the conveyor comprise a toothed pinion for each said roller to be driven coaxial therewith and connected thereto and a cooperating gripping rack member, each pinion being engageable with the gripping rack member mounted by the sub-frame in the conveyor path, whereby the movement of the conveyor in its path causes rotation of the pinion and its associated roller by its engagement with the gripping rack member.

9. A machine as claimed in claim 8, and including a releasing rack member mounted by the sub-frame in the conveyor path after the severing station and causing rotation of the toothed pinions opposite to that of the gripping rack member to release the severed tops from the conveyor gripping means.

10. A machine as claimed in claim 1, wherein the knife means for severing tops at the severing station comprise an endless loop knife blade, and means mounting the blade for movement transverse to the direction of movement of the conveyor.

11. A machine as claimed in claim 10, wherein the means mounting the knife blade permits movement thereof relative to the conveyor to change the inclination of the blade relative to the adjacent surface of the conveyor.

12. A machine as claimed in claim 1, wherein decapped and detopped fruits and vegetables on the upwardly-moving section of the conveyor not gripped by the gripping means will move downwardly rearwardly against the motion of the conveyor to a discharge station from the conveyor at a lower level than the said delivering station, the machine including barrier means between the receiving station and the said discharge station causing transverse movement on the conveyor of fruits and vegetables moving rearwardly against the motion of the conveyor to facilitate gripping of the tops thereof.

13. A machine as claimed in claim 1, wherein decapped and detopped fruits and vegetables on the upwardly-moving section of the conveyor not gripped by the gripping means will move downwardly rearwardly against the motion of the conveyor, the machine including at least one barrier means between the receiving station and the discharge station, and at least one barrier means between the receiving station and the severing station, each barrier means causing transverse movement on the conveyor of fruits and vegetables moving rearwardly against the motion of the conveyor to facilitate gripping of the tops thereof.

14. A machine as claimed in claim 12, wherein each barrier means includes transversely spaced vertical baffles suspended for free forward swinging motion in the direction of movement of the conveyor, and fixed vertical baffles behind the suspended baffles and spaced therefrom, each fixed baffle extending across the space between two adjacent suspended baffles.

15. A machine as claimed in claim 13, wherein each barrier means includes transversely spaced vertical baffles suspended for free forward swinging motion in the direction of movement of the conveyor, and fixed vertical baffles behind the suspended baffles and spaced therefrom, each fixed baffle extending across the space between two adjacent suspended baffles.

16. A machine as claimed in claim 1, wherein the means mounting the sub-frame to the frame for said orbital motion consists of four spaced upwardly-extending rods each disposed at the corner of a trapezoid, respective ball joints at the lower ends of the rods connecting the lower ends thereof to the frame, and respective ball joints at the upper ends of the rods connecting the upper ends thereof to the frame.

17. A machine for decapping fruits and vegetables comprising:
a frame;
a sub-frame;
means mounting the sub-frame to the frame for orbital motion relative to the frame in two directions transverse to one another and having at least a component in the horizontal plane;
drive means connected to the sub-frame for moving the sub-frame relative to the frame in the said orbital motion;
an upwardly-inclined conveyor mounted by the sub-frame for conveying fruits and vegetables upwards thereon from a receiving station on the upwardly-moving part thereof;
the conveyor including gripping means operative over the said upwardly-moving part of its path for gripping the caps of the fruits and vegetables and for pulling the caps therefrom, the fruits and vegetables that have their caps thus pulled therefrom thereafter moving downwardly on the upwardly-moving part of the conveyor to a discharge station;
the said orbital motion of the sub-frame and the conveyor changing the orientation of the fruits and vegetables on the conveyor to facilitate the gripping of their caps by the said conveyor gripping means.

* * * * *